United States Patent
Yoshida et al.

(10) Patent No.: US 8,489,933 B2
(45) Date of Patent: Jul. 16, 2013

(54) DATA PROCESSING DEVICE AND METHOD FOR MEMORY DUMP COLLECTION

(75) Inventors: Kazuhiro Yoshida, Kawasaki (JP);
Masakazu Watanabe, Kawasaki (JP);
Nobuhiro Tachino, Kawasaki (JP);
Kenji Kaneshige, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 13/094,071

(22) Filed: Apr. 26, 2011

(65) Prior Publication Data

US 2012/0102370 A1  Apr. 26, 2012

(30) Foreign Application Priority Data

Apr. 28, 2010  (JP) ................................. 2010-103343

(51) Int. Cl.
*G06F 11/00* (2006.01)

(52) U.S. Cl.
USPC ....................................... 714/38.11

(58) Field of Classification Search
USPC ....................................... 714/38.11
See application file for complete search history.

(56) References Cited

U.S. PATENT DOCUMENTS

| | | | |
|---|---|---|---|
| 6,467,007 B1 * | 10/2002 | Armstrong et al. | 710/260 |
| 6,687,818 B1 * | 2/2004 | Svenkeson et al. | 713/2 |
| 6,772,259 B2 * | 8/2004 | Corrigan et al. | 710/260 |
| 7,162,560 B2 * | 1/2007 | Taylor et al. | 710/266 |
| 2003/0120968 A1 * | 6/2003 | Andress et al. | 714/25 |
| 2006/0069944 A1 * | 3/2006 | Oguma | 714/5 |
| 2006/0156057 A1 * | 7/2006 | Babu | 714/5 |
| 2011/0179314 A1 * | 7/2011 | Patel et al. | 714/48 |

FOREIGN PATENT DOCUMENTS

| | | |
|---|---|---|
| JP | 2003-506776 A | 2/2003 |
| JP | 2007-094537 A | 4/2007 |

* cited by examiner

*Primary Examiner* — Yolanda L Wilson
(74) *Attorney, Agent, or Firm* — Fujitsu Patent Center

(57) ABSTRACT

A data processing device for memory dump collection, the data processing device includes: a processor to issue a first interrupt upon instructions to collect a memory dump being entered, to issue a second interrupt for running a program put in an address indicated by a reset vector upon the first interrupt being issued, and to record the memory dump in a storage unit in a process of running the program upon the second interrupt being issued.

7 Claims, 5 Drawing Sheets

DATA PROCESSING DEVICE AND METHOD FOR MEMORY DUMP COLLECTION

CROSS-REFERENCE TO RELATED APPLICATIONS

This application is based upon and claims the benefit of priority of the prior Japanese Patent Application No. 2010-103343, filed on Apr. 28, 2010, the entire contents of which are incorporated herein by reference.

FIELD

The present invention relates to a data processing device and a method for memory dump collection.

BACKGROUND

If a serious failure occurs in an OS (Operating System) of a computer, contents of a memory and all pieces of context information of a CPU which has been working are stored in a storage device as materials for examining the failure. The stored data is called a memory dump in general. Typical methods for memory dump collection are: (1) the OS in which the failure has occurred records a memory dump by itself; (2) the OS in which the failure has occurred boots itself again not by means of firmware, etc., and the OS initializes a device after being activated afresh so as to record a memory dump; (3) shift the control from the OS to an entity except for the OS such as firmware after the failure occurs, and the entity records a memory dump; and (4) reset the system when the failure occurs, and an entity except for the OS such as firmware senses the failure occurrence and records a memory dump as extended from the reset process (e.g., Japanese Laid-open Patent Publication No. 2007-94537).

SUMMARY

According to an aspect of the embodiment, a data processing device for memory dump collection, the data processing device includes: a processor to issue a first interrupt upon instructions to collect a memory dump being entered, to issue a second interrupt for running a program put in an address indicated by a reset vector upon the first interrupt being issued, and to record the memory dump in a storage unit in a process of running the program upon the second interrupt being issued.

The object and advantages of the embodiment will be realized and attained by at least the features, elements, and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Each one of the ordinary methods for memory dump collection described above is insufficient for following reasons.

According to the method (1), as attempting to collect a memory dump by itself while being in failure, the OS may be unable to collect the memory dump.

According to the method (2), as an initializing process to be carried out by means of firmware is omitted and the OS initializes the device, errors which normally do not occur in an ordinary initializing sequence can possibly occur on the device.

According to the method (3), the memory dump collection process is implemented by extension of an extraordinary interrupt such as an NMI (Non Maskable Interrupt) or an SMI (System Management Interrupt). For many operating systems, however, a fixed process is implemented for the NMI. Thus, if the memory dump collection process is implemented by extension of the NMI, there is a problem in that a wide use is not secured for the OS. Meanwhile, although the SMI is an interrupt to be occupied by means of firmware, an extraordinary mode called SMM (System Management Mode) which works by extension of the SMI is limited. A memory which can be accessed, e.g., is limited to 2 MByte and an operation in an extraordinary 16-bit instruction mode for the SMM exclusive use is forced. Thus, it is difficult in the SMM to collect a memory dump of any OS.

The method (4) is most reliable among the above methods. There is a problem in the x86 architecture, however, in that a reset operation always causes a memory controller to be reset, and that contents of a system memory are made indefinite. Thus, the method (4) cannot be employed in the x86 architecture.

The invention has been made in view of the above problems, and an advantage of an aspect of the invention is to provide a data processing device and a method for memory dump collection which can enhance certainty and provide a wide use of memory dump collection.

Figure 1:
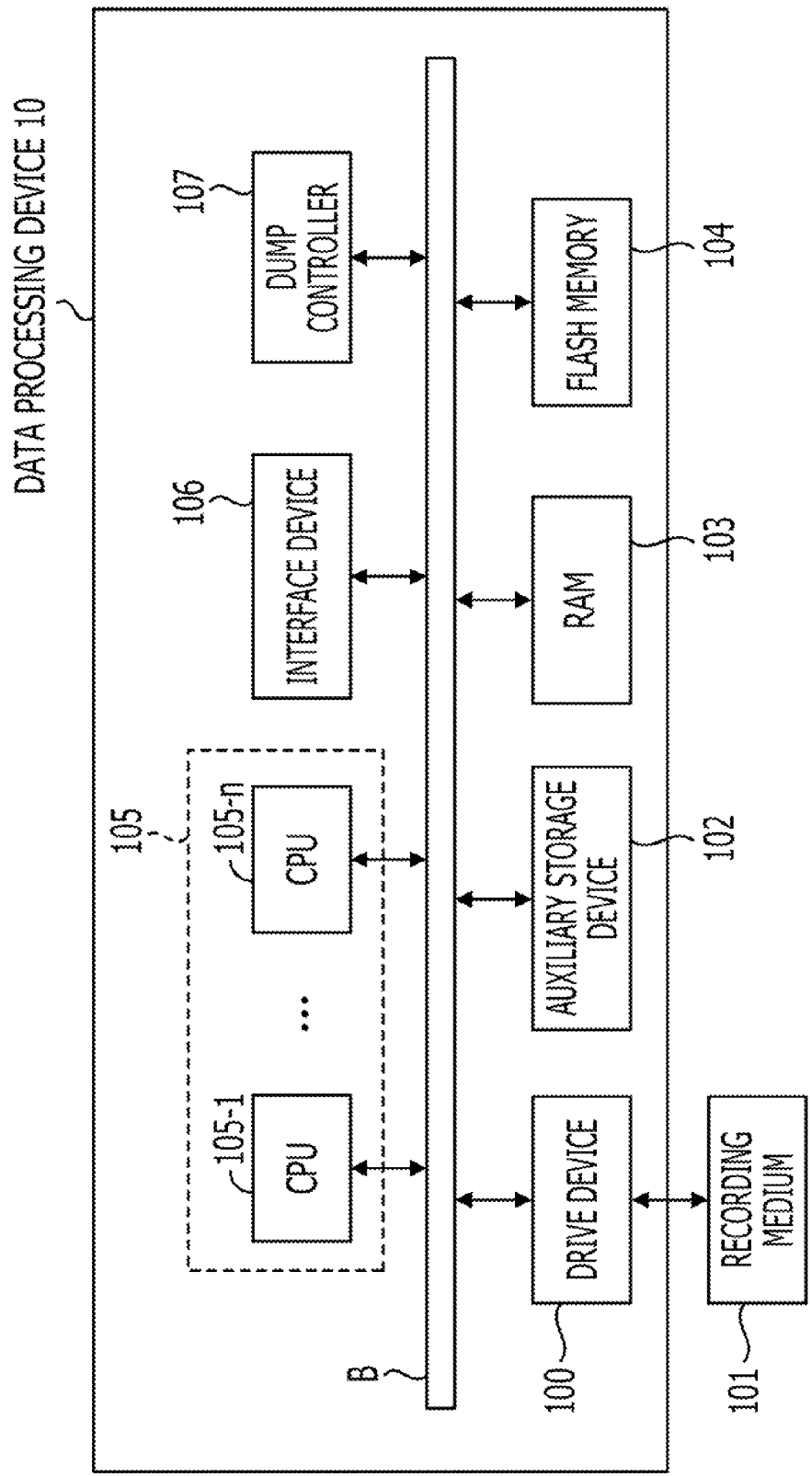
FIG. 1 illustrates a hardware configuration of a data processing device of an embodiment of the invention.

An embodiment of the invention will be explained with reference to the drawings hereafter. FIG. 1 illustrates an example hardware configuration of a data processing device of the embodiment of the invention. The data processing device 10 illustrated in FIG. 1 has a drive device 100, an auxiliary storage device 102, a RAM 103, a flash memory 104, a CPU 105 or a plurality of CPUs 105 which are CPU 105-1 to CPU 105-n, an interface device 106, a dump controller 107, e.g., which are connected to one another through a bus B.

A recording medium 101 such as a CD-ROM provides a program which implements a process on the data processing device 10. If the recording medium 101 is set into the drive device 100, the program is installed from the recording medium 101, through the drive device 100 to the auxiliary storage device 102. It is not always necessary to install the program from the recording medium 101, however, and the program can be downloaded from another computer through a network. The auxiliary storage device 102 stores therein the installed program as well as necessary files, data, and the like for example.

Upon being instructed to be run, the program is read from the auxiliary storage device 102 and is stored in the RAM 103. The flash memory 104 stores firmware therein. The CPUs 105 each implement a function of the data processing device 10 in accordance with the program stored in the RAM 103. The CPUs 105 of the embodiment are based on Intel x86 or Intel64 architecture. Further, if the CPUs 105 are plural CPUs, the single RAM 103 is used in common by the plural CPUs. The interface device 106 is used as an interface for being connected to a network.

The dump controller 107 is an exclusive controller in which a program is integrated for sensing instructions on memory dump collection and starting a memory dump collection process upon the instructions on the collection being sensed.

Figure 2:
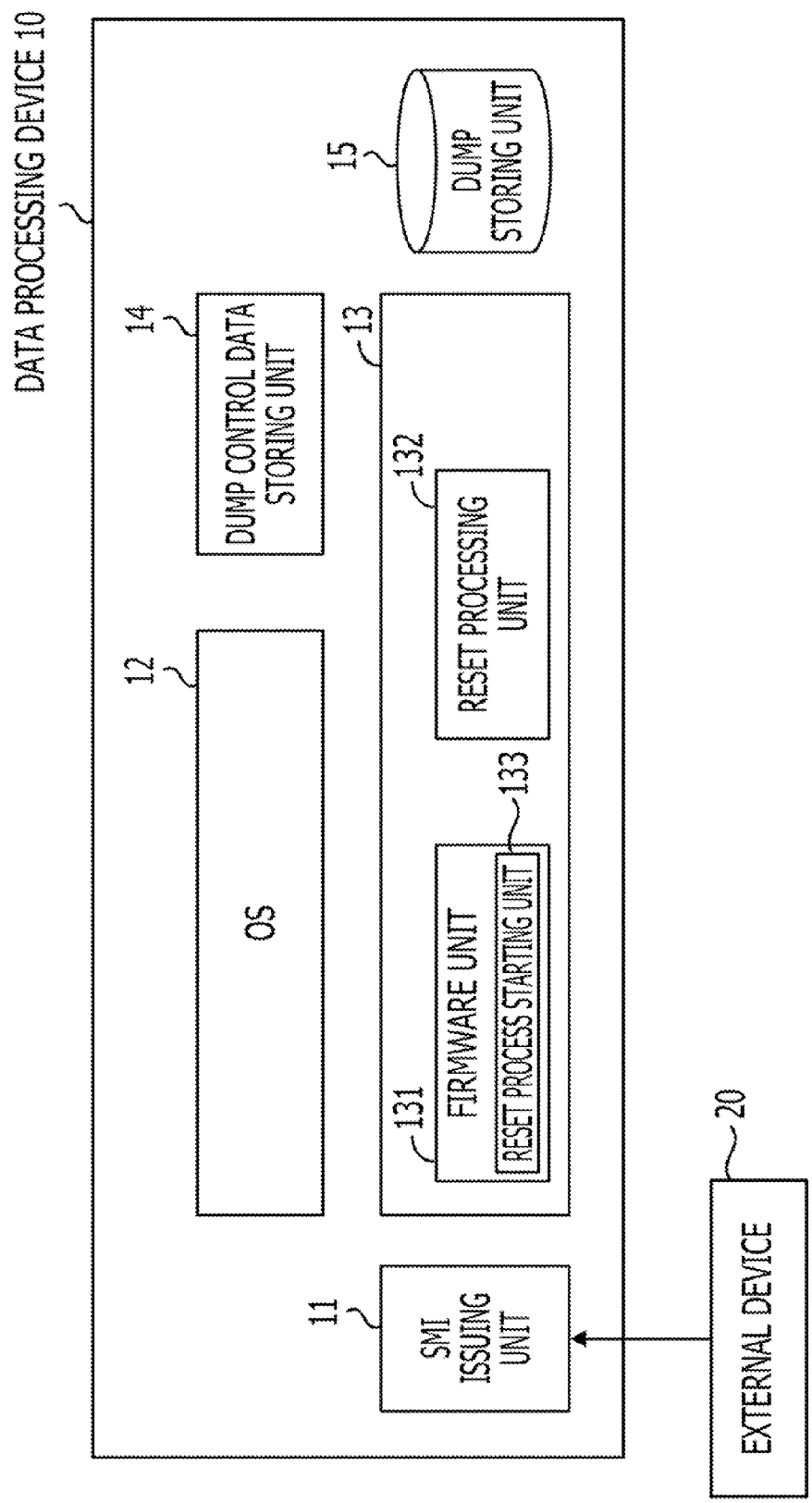
FIG. 2 illustrates a software configuration of the data processing device of the embodiment of the invention.

FIG. 2 illustrates an example software configuration of the data processing device of the embodiment of the invention. In FIG. 2, the data processing device 10 has an SMI issuing unit 11, an OS 12, a firmware unit 13, a dump control data storing unit 14, and a dump storing unit 15, for example.

The SMI issuing unit 11 issues an interrupt called an SMI (System Management Interrupt) to every CPU 105 in order that a memory dump collection process starts in response to the instructions on the memory dump collection. The SMI is a hardware interrupt of a highest priority, and can be used on x86 or intel64 architecture. Why the SMI is issued so that the memory dump collection process of the embodiment starts is that the OS 12 is equipped with no fixed process and can be equipped with any interrupt process, differently from an NMI (Non-Maskable Interrupt), for example. Incidentally, it is not requisite for starting the memory dump collection process of the embodiment to be an interrupt process of the highest priority. Thus, an interrupt process except for the SMI including an interrupt process to be defined in the future can be used so as to start the memory dump collection process, as long as it is ensured that the OS 12 can be equipped with any interrupt process regardless of the type of the OS 12.

The SMI issuing unit 11 of the embodiment receives instructions on memory dump collection from an external device 20. The external device 20 is a computer connected to the data processing device 10 through a network. The external device 20 works, e.g., as a Web server, and displays a Web page on which the instructions on the memory dump collection are accepted from a user on the external device 20 or a terminal which is not illustrated in the drawings such as a PC connected to the external device 20 through the network. If the instructions on the memory dump collection are entered through the Web page, the external device 20 transmits the instructions on the memory dump collection to the SMI issuing unit 11. The SMI issuing unit 11 communicates with the external device 20 on the basis, e.g., of an IPMI (Intelligent Platform Management Interface). Incidentally, the SMI issuing unit 11 can be implemented by a process which a program integrated in the dump controller 107 makes the dump controller 107 run.

The OS 12 is a commonly called OS (Operating System) such as Windows (trademark), Linux (trademark) or UNIX (trademark). The OS 12 is stored in the auxiliary storage device 102 and is loaded onto the RAM 103 before being run.

The firmware unit 13 is, e.g., a BIOS (Basic Input/Output System). The firmware unit 13 is stored in the flash memory 104 and is loaded onto the RAM 103 before being run. As illustrated in FIG. 2, the firmware unit 13 includes an SMI handler 131, a reset processing unit 132, etc. The SMI handler 131 is an interrupt handler of an SMI. The SMI handler 131 includes a reset process starting unit 133. The reset process starting unit 133 produces an interrupt for starting a reset process upon an SMI concerning instructions on memory dump collection being issued. The reset processing unit 132 records a memory dump, and carries out an initializing process (reset process) upon a reset button being pushed.

Incidentally, the firmware unit 13 and the OS 12 makes the CPUs 105 carry out a process.

The dump control data storing unit 14 stores data for controlling the memory dump collection process by using a partial storage area of the RAM 103. The partial storage area is an area that the OS 12 is prohibited from accessing in memory layout data defined by the firmware unit 13.

The dump storing unit 15 stores therein a collected memory dump.

A procedure processed by the data processing device 10 will be explained hereafter. To begin with, a procedure in a process of an ordinary reset operation will be explained. The ordinary reset operation is in a state where the OS 12 is not in failure (panic) and in normal operation.

Figure 3:
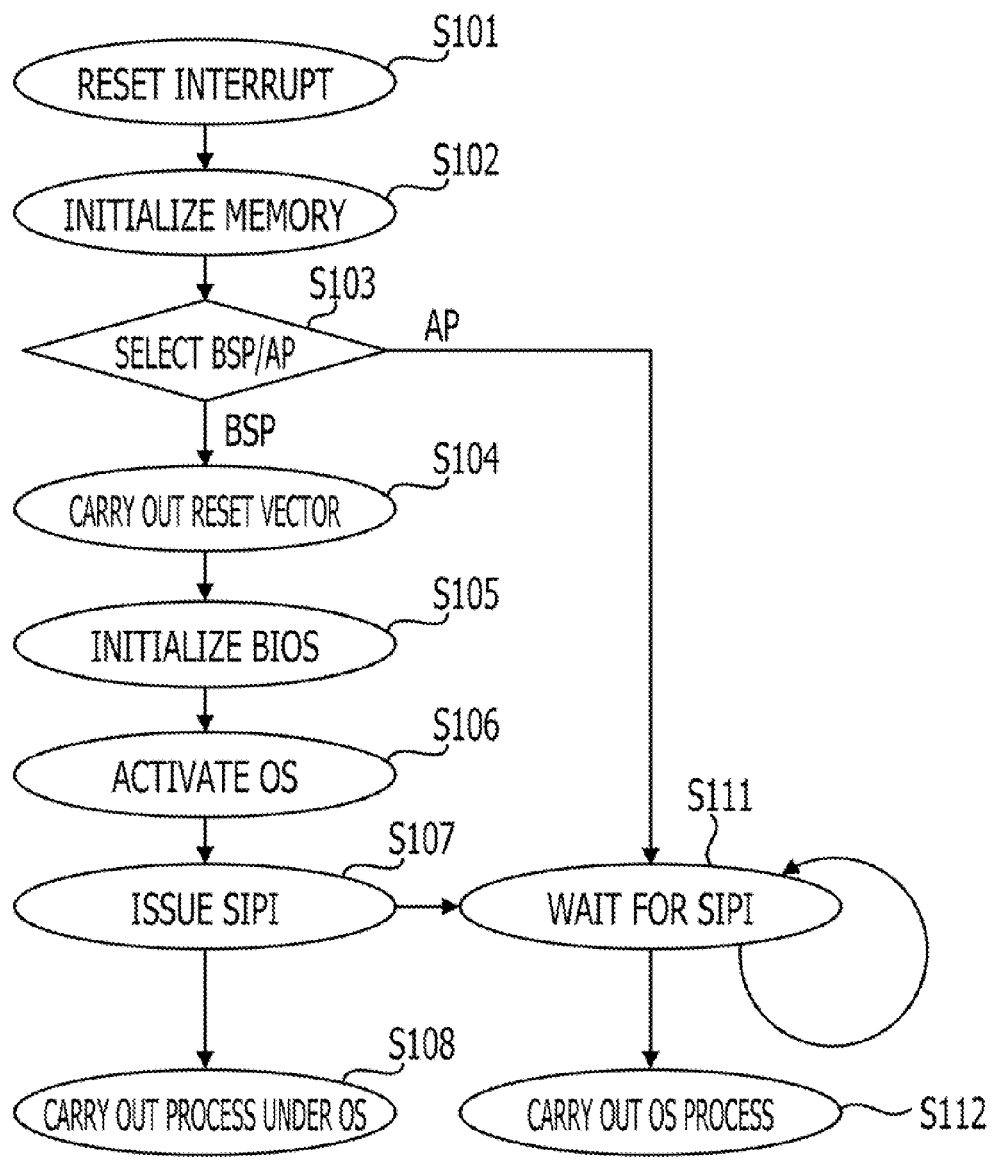
FIG. 3 illustrates a procedure in a process of an ordinary reset operation.

FIG. 3 illustrates a procedure of the data processing device 10 in a process of an ordinary reset operation.

If a user pushes the reset button of the data processing device 10, a reset interrupt is issued (S101). Further, a memory controller which is not illustrated initializes contents of the memory (RAM 103) (S102). As a result, the contents of the RAM 103 are made indefinite. Then, a BSP (Bootstrap Processor) and an AP (Application Processor) are selected from the CPUs 105 (S103). The BSP is a CPU which carries out a main process upon being activated. One of the plural CPUs 105 is selected as the BSP. Thus, the CPUs 105 except for the BSP are selected as the APs which follow the BSP and work.

The CPU 105 selected as the BSP carries out a control operation in accordance with a program put in an address indicated by a reset vector (S104). The program of the embodiment is the reset processing unit 132. The reset processing unit 132 carries out a procedure for initializing the BIOS in an ordinary reset operation (S105). Then, the reset processing unit 132 activates the OS 12 (S106). Then, the reset processing unit 132 issues an SIPI (Start-up IPI (Inter-Processor Interrupt)) to all the CPUs 105 (S107). The SIPI is an interrupt to be used by the BSP for activating the AP in a multi-processor configuration. After issuing the SIPI, the CPU 105 being the BSP carries out a process as controlled by the OS 12 (S108).

Meanwhile, the CPU 105 selected as the AP waits for the BSP to issue the SIPI (S111). Upon the SIPI being issued, the CPU 105 carries out a process as controlled by the OS 12 (S112).

Then, a procedure of the memory dump collection process carried out upon instructions on the memory dump collection being entered while the OS 12 of the data processing device 10 is in failure (panic) will be explained.

Figure 4:
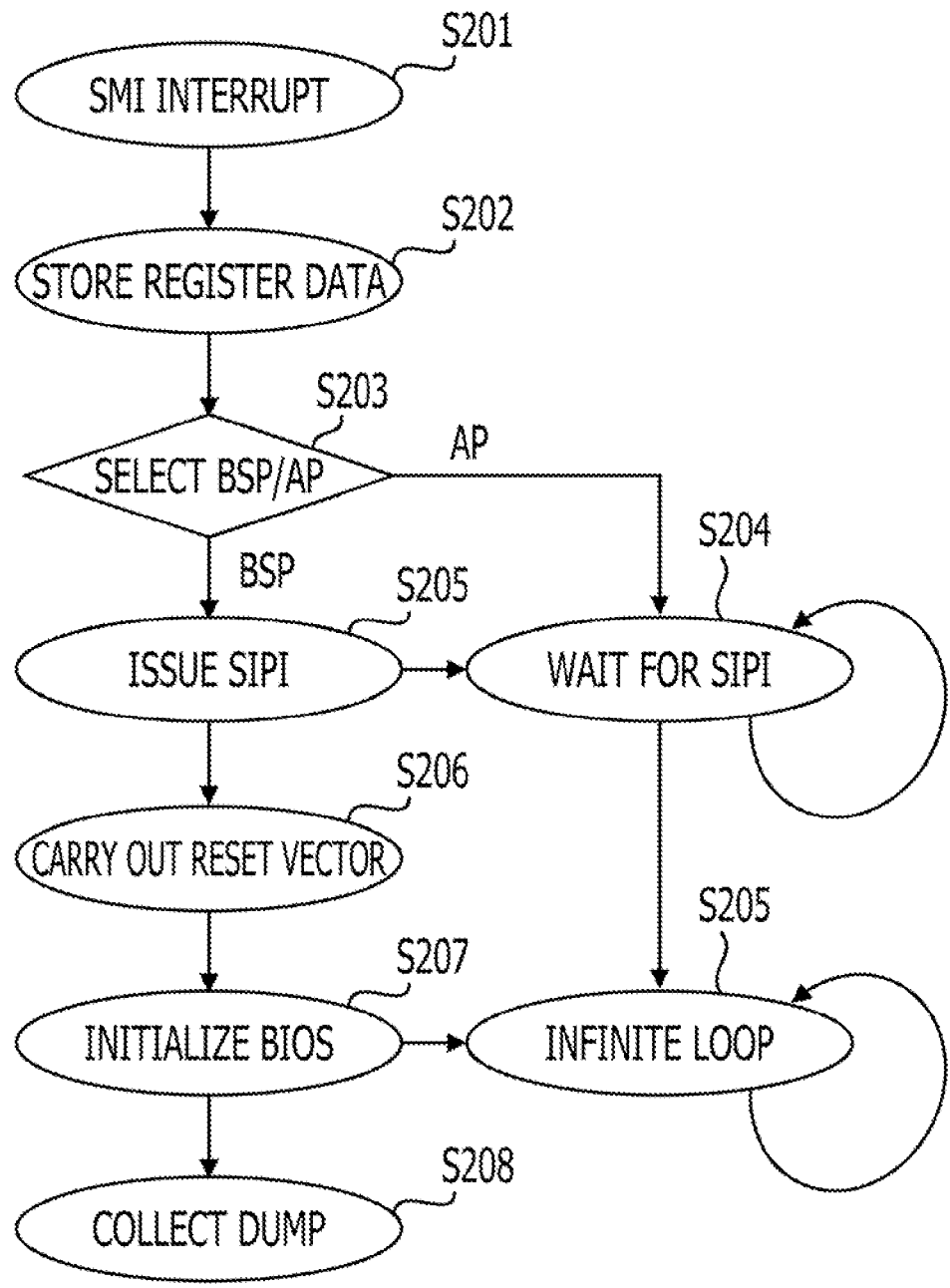
FIG. 4 illustrates a procedure in a memory dump collection process.

FIG. 4 illustrates a procedure in the memory dump collection process.

Upon receiving instructions on the memory dump collection from the external device 20 in a state in which the OS 12 is in failure, the SMI issuing unit 11 issues an SMI to all the CPUs 105 (S201). As issuing the SMI, further, the SMI issuing unit 11 records on the dump control data storing unit 14 data indicating that the issuance of the SMI is due to the instructions on the memory dump collection.

Figure 5:
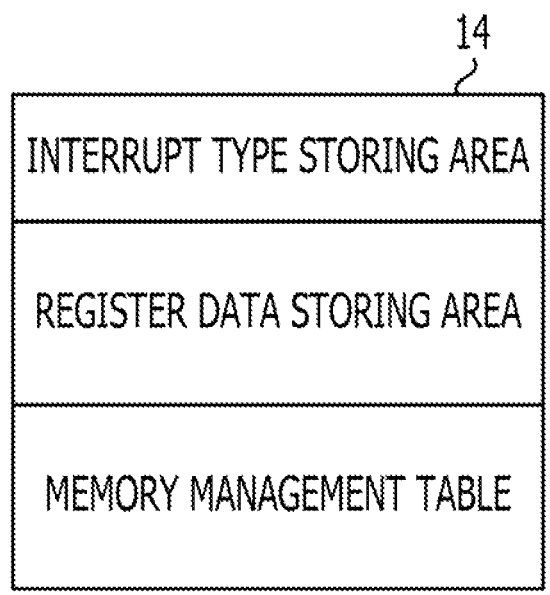
FIG. 5 illustrates an example configuration of a dump control data storing unit.

FIG. 5 illustrates an example configuration of the dump control data storing unit. As illustrated in FIG. 5, the dump control data storing unit 14 includes an interrupt type storing area, a register data storing area, and a memory management table, for example.

The interrupt type storing area is an area in which the data indicating that the issuance of the SMI is due to the instructions on the memory dump collection is recorded. The interrupt type storing area can be, e.g., an area of one bit. In this case, it is sufficient to indicate that the issuance of the SMI is due to the instructions on the memory dump collection in a case where "1" is recorded on that area. The register data storing area is an area into which register data (context data) of the respective CPUs 105 is sheltered at a step on a later stage. The memory management table is an area in which layout data of the RAM 103 is recorded upon the data processing device 100 being activated. The layout data indicates an area that the OS 12 can use or is prohibited from using, etc. in a storage area (memory space) of the RAM 103.

Incidentally, upon being provided with an issued SMI, the CPUs 105 each shift to an operation mode called a system management mode (SMM), and carry out a fixed process as shifting to the SMM. The CPUs 105, e.g., each store register data of the respective CPUs 105 in a particular position in the memory space (SMRAM). The register data is stored in a storage unit inside the CPU 105 and indicates a state of a process being carried out by the CPU 105.

Then, the CPUs 105 each carry out an interrupt process according to a program put in an address indicated by an interrupt vector for the SMM. The program of the embodiment is the reset process starting unit 133.

The reset process starting unit 133 of each of the CPUs 105 shelters (moves or copies) the register data automatically stored in the SMRAM by each of the CPUs 105 into the register data storing area of the dump control data storing unit 14 (S202). Why the register data stored by the CPU 105 is sheltered afresh as described herewith is that where the register data is stored by the CPU 105 is fixed and that the data recorded there is in danger of being overwritten in case of an SMI issued again. Incidentally, the register data sheltered into the register data storing area is incorporated in the memory dump in a process of a later stage. As a result, a memory dump including safely sheltered register data can be collected.

Then, the reset process starting unit 133 of each of the CPUs 105 determines whether the relevant CPU 105 is a BSP or an AP (S203). How to determine that is not limited to what has been fixed. One of the CPUs 105 which has received the SMI first can be selected as the BSP, e.g., or another one of the CPUs 105 given a latest one of numbers given to the respective CPUs 105 can be selected as the BSP. If the CPU 105 having received the SMI first is selected as the BSP, e.g., the reset process starting unit 133 of each of the CPUs 105 can try to record "1" into a particular memory area in which "0" is initially recorded. If "1" is already recorded in that memory area, the relevant CPU 105 is the AP. If "0" is already recorded in that memory area, the relevant CPU 105 is the BSP.

The reset process starting unit 133 of the CPU 105 being the AP runs an infinite loop and waits (S204). Meanwhile, the reset process starting unit 133 of the CPU 105 being the BSP issues an SIPI to every one of the CPUs 105 (S205), in order to leave the SMM where various kinds of limitations are imposed. An address of an interrupt vector can be specified for the SIPI as a parameter. The reset process starting unit 133 of the BSP specifies an interrupt vector for an infinite loop for the SIPI for the AP. Thus, the CPU 105 being the AP continues the infinite loop after receiving the SIPI (S205). The AP is made run the infinite loop in order that the AP is prevented from carrying out an unnecessary process which is inconvenient for the memory dump collection process carried out by the CPU 105 being the BSP.

Meanwhile, the reset process starting unit 133 of the BSP specifies an address of a reset vector for the SIPI for the BSP (itself). Thus, the CPU 105 of the BSP carries out a process in accordance with the reset processing unit 132 put in an address indicated by the rest vector (S206). Incidentally, as having received the SIPI and thereby left the SMM, the CPU 105 is released from various kinds of limitations of the SMM in the following process.

Then, the reset processing unit 132 of the BSP carries out a procedure for initializing the BIOS in an ordinary reset operation (S207). That is, a same process as the step S105 is carried out. Thus, devices, for example, are initialized similarly as in an ordinary reset operation. Then, the reset processing unit 132 records the memory dump in the dump storing unit 15 (S208). In more detail, the reset processing unit 132 refers to the interrupt type storing area of the dump control data storing unit 14, and identifies that the instructions on the memory dump collection has been entered. Upon identifying the above, the reset processing unit 132 refers to the memory management table of the dump control data storing unit 14, identifies an area that the OS 12 is using and records the contents of that area as a memory dump. Further, the reset processing unit 132 incorporates in the memory dump and records the register data of the respective CPUs 105 sheltered in the register data storing area of the dump control data storing unit 14.

Incidentally, the reset processing unit 132 refers to the interrupt type storing area of the dump control data storing unit 14, checks that no instructions on the memory dump collection has been entered and activates the OS 12 (e.g., an ordinary reset process) at the step S106, although its explanation was omitted with reference to FIG. 3.

Incidentally, the instructions to start a memory dump collection process are transmitted from the external device 20 to the SMI issuing unit 11 as explained above. Instead, the instructions to start a memory dump collection process can be entered, e.g., through a button (dump instructions button), for example, provided to the data processing device 10. The dump controller 107 installed as a controller corresponding to the dump instructions button is sufficient in this case. Further, the instructions to start a memory dump collection process can be entered from both the external device 20 and the dump instructions button. The data processing device 10 provided with the dump controllers 107 individually corresponding to those is sufficient in this case. Further, the controller which accepts the start instructions can be different from the controller which issues the SMI. In this case, the former controller notifies the latter controller of entry of the start instructions. The latter controller issues the SMI in response to the notice.

Further, the data processing device 10 has a plurality of the CPUs 105 (e.g., having a multi-processor configuration) as explained above. Instead, the CPU 105 that the data processing device 10 has can be single. The single CPU 105 which carries out a process as the BSP described above is sufficient in this case.

According to the embodiment, as described above, the entity except for the OS 12 being in failure, e.g., the firmware unit 13, carries out a memory dump collection process. Thus, the collection process can succeed more probably regardless of the state of the OS 12. That is, certainty of the memory dump collection process can be enhanced.

Further, the SMI issuing unit 11 issues an SMI and the reset process starting unit 133 issues an SIPI in a state being an SMM so as to make the CPU 105 being the BSP run a reset vector, so that a warm boot which works similarly as an ordinary boot except for lack of memory clearance can be emulated. That is, an operation similar to the warm boot can be implemented on a CPU based on the x86 or Intel64 architecture lacking a warm boot function. As a result, various devices can be certainly initialized in a state in which a memory is not initialized (e.g., the step S102 in FIG. 3 is not carried out), and a memory dump can be safely collected.

Further, the SMI and the SIPI are interrupt processes which do not depend on the type of the OS 12. Thus, implement memory dump recording on the basis of such interrupt processes so as to collect a memory dump by depending less on the type of the OS 12. That is, the wide use concerning the memory dump collection can be enhanced.

Although an embodiment of the invention has been described above in detail, the invention is not limited to such particular embodiment, and the embodiment can be variously modified or changed within the scope of the invention described as claims.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A data processing device comprising:
    an interrupt issuing means for issuing a first interrupt upon instructions to collect a memory dump being entered;
    a reset process starting means for issuing a second interrupt for running a program put in an address indicated by a reset vector upon the first interrupt being issued; and
    a memory dump recording means for recording the memory dump in a storage unit in a process of running the program upon the second interrupt being issued.

2. The data processing device according to claim 1, further comprising a plurality of CPUs, wherein:
    the interrupt issuing means issues the first interrupt to the CPUs individually;
    the reset process starting means makes one of the CPUs issue the second interrupt; and
    the memory dump recording means makes the one of the CPUs record the memory dump.

3. The data processing device according to claim 1, wherein:
    the reset process starting means shelters register data into a particular storage area before issuing the second interrupt; and
    the memory dump recording means records the memory dump which includes the register data sheltered into the particular storage area.

4. A method for memory dump collection, the method comprising:
    issuing, by a computer, a first interrupt upon instructions to collect a memory dump being entered;
    starting for issuing a second interrupt for running a program put in an address indicated by a reset vector upon the first interrupt being issued; and
    recording the memory dump in a storage unit in a process of running the program upon the second interrupt being issued.

5. The method for memory dump collection according to claim 4, wherein:
    the computer has a plurality of CPUs;
    the issuing includes issuing the first interrupt to the CPUs individually;
    the starting includes making one of the CPUs issue the second interrupt; and
    the recording includes making the one of the CPUs record the memory dump.

6. The method for memory dump collection according to claim 4, wherein:
    the starting includes sheltering register data into a particular storage area before issuing the second interrupt; and
    the recording includes recording the memory dump which includes the register data sheltered into the particular storage area.

7. A data processing device for memory dump collection, the data processing device comprising:
    a processor to issue a first interrupt upon instructions to collect a memory dump being entered, to issue a second interrupt for running a program put in an address indicated by a reset vector upon the first interrupt being issued, and to record the memory dump in a storage unit in a process of running the program upon the second interrupt being issued.

* * * * *